United States Patent [19]

D'Almeida et al.

[11] Patent Number: 4,594,840
[45] Date of Patent: Jun. 17, 1986

[54] PNEUMATIC SYSTEM FOR COMBINE HEADER HEIGHT CONTROL

[75] Inventors: Werner K. D'Almeida; Oldemar Boeck, both of Curitiba, Brazil

[73] Assignee: Sperry Corporation, New Holland, Pa.

[21] Appl. No.: 702,774

[22] Filed: Feb. 19, 1985

Related U.S. Application Data

[62] Division of Ser. No. 560,100, Dec. 12, 1983, abandoned.

[51] Int. Cl.$^4$ .................... A01D 41/06; A01D 75/18
[52] U.S. Cl. .......................................... 56/11.2; 56/208
[58] Field of Search .................... 56/11.2, 10.2, 208, 56/DIG. 15

[56] References Cited

U.S. PATENT DOCUMENTS

| | | | |
|---|---|---|---|
| 3,698,164 | 10/1972 | Boone et al. | 56/208 |
| 3,722,193 | 3/1973 | Strubbe | 56/208 |
| 3,728,851 | 4/1973 | Van Antwerp | 56/208 |
| 3,805,497 | 4/1974 | Ross | 56/DIG. 15 |
| 3,886,718 | 6/1975 | Talbot | 56/208 |
| 3,908,345 | 9/1975 | Oni et al. | 56/208 |
| 3,953,959 | 5/1976 | Decruxenaere | 56/208 |
| 4,261,161 | 4/1981 | Colgrove et al. | 56/10.2 |
| 4,335,561 | 6/1982 | Swanson et al. | 56/10.2 |
| 4,337,611 | 7/1982 | Maclander et al. | 56/DIG. 15 |
| 4,470,243 | 9/1984 | Rayfield | 56/11.2 |

Primary Examiner—Paul J. Hirsch
Attorney, Agent, or Firm—Larry W. Miller; Frank A. Seemar; Darrell F. Marquette

[57] ABSTRACT

A pneumatic system for automatically controlling the height of a crop harvesting header on a combine is disclosed wherein the pneumatic system includes a cylinder which receives compressed air through pneumatic directional valves mounted on the crop harvesting header and actuated through ground sensors positioned under the header. The flow of compressed air from the directional valves operates a pneumatic cylinder, which in turn drives a hydraulic valve controlling the hydraulic header lift mechanism to move the header relative to the frame of the combine to maintain the relative position of the header to the ground. The pneumatic cylinder is also actuated to effect a raising of the crop harvesting header by another pneumatic directional valve connected to a control lever for shifting the primary drive of the combine to a reverse direction, thereby automatically raising the header when the combine is moved in a reverse direction.

3 Claims, 5 Drawing Figures

PNEUMATIC SYSTEM FOR COMBINE HEADER HEIGHT CONTROL

CROSS-REFERNCE TO RELATED APPLICATION

This is a division of U.S. application Ser. No. 560,100, filed Dec. 12, 1983 now abandoned.

BACKGROUND OF THE INVENTION

The present invention relates generally to crop harvesting headers attachable to a combine to initiate the crop harvesting process and, more particularly, to a pneumatic control mechanism for automatically adjusting the height of the header so that the header will follow changing longitudinal ground contours.

Header height control systems for combines have utilized electrically controlled hydraulic valves. Such systems can result in a larger load loss in the hydraulic system because of the need to intersperse a solenoid valve into the system, causing a larger heat generation into the hydraulic circuit. Furthermore, electrical microswitches are generally fragile and deteriorate easily when utilized in the farm machinery environment, particularly when exposed to grain residues, dust, weather conditions, etc. Accordingly, it would be desirable to provide an improved header height control mechanism to simplify the operation of the mechanism, reduce costs, simplify maintenance and improve durability.

SUMMARY OF THE INVENTION

It is an object of this invention to overcome the aforementioned disadvantages of the prior art by providing a pneumatic header height control system for combine crop harvesting headers.

It is another object of this invention to control the height of the header relative to the combine frame pneumatically to permit the header to follow the ground contours.

It is an advantage of this invention that the pneumatic control can be installed on existing header height control mechanisms without dismantling the machine hydraulics.

It is a feature of this invention that a smaller heat generation during operation of the header height control permits a better machine performance.

It is another advantage of this invention that the pneumatic control mechanism can be installed in parallel with a mechanism for manually actuating the header height control.

It is another feature of this invention that the pneumatic cylinder can be connected directly to the spool of the hydraulic valve to directly affect a shifting of the spool in response to a sensing of the changing longitudinal ground contours to affect a changing of the height of the header.

It is still another object of this invention to provide a mechanism for automatically raising the crop harvesting header whenever the combine is engaged to be driven in a reverse direction.

It is yet another advantage of this invention that an oiler provides a mist of lubricating fluid within the flow of air thorughout the pneumatic system to lubricate the moving parts.

It is yet another advantage of this invention that the pneumatic system can utilize quick attach type connectors to facilitate a mounting of the system and maintenance of its operation.

It is yet another object of this invention to provide a pneumatic header height control mechanism for a combine harvester which is durable in construction, inexpensive of manufacture, carefree of maintenance, facile in assemblage and simple and effective in use.

These and other objects, features and advantages are accomplished according to the instant invention by providing a pneumatic system for automatically controlling the height of a crop harvesting header on a combine when the pneumatic system includes a cylinder which receives compressed air through directional valves mounted on the crop harvesting header and actuated through ground sensors positioned under the header. The flow of compressed air from the directional valves operates a pneumatic cylinder, which in turn drives a hydraulic valve controlling the hydraulic header lift mechanism to move the header relative to the frame of the combine to maintain the relative position of the header to the ground. The pneumatic cylinder is also actuated to effect a raising of the crop harvesting header by another pneumatic directional valve connected to a control lever for shifting the primary drive of the combine to a reverse direction, thereby automatically raising the header when the combine is moved in a reverse direction.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
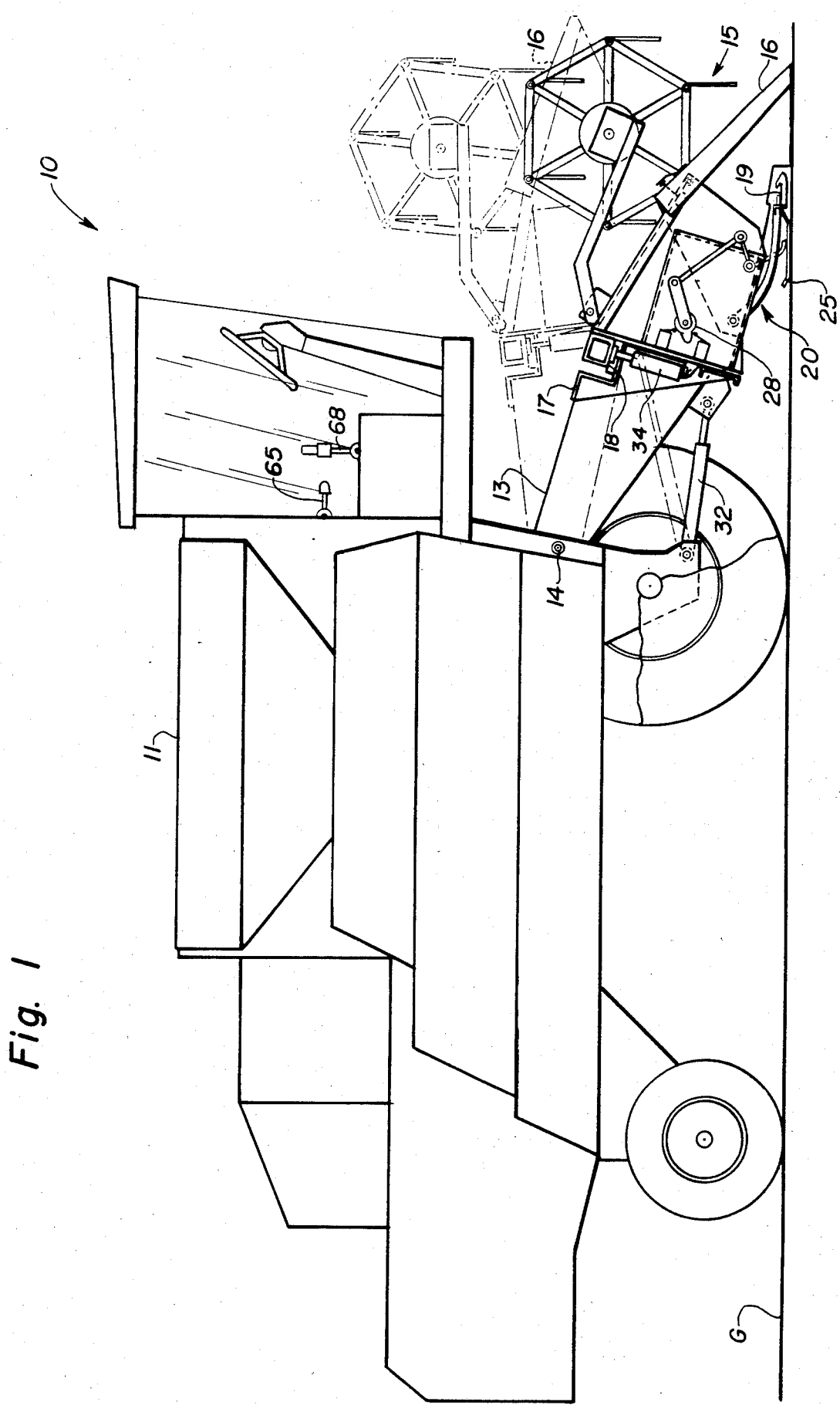
FIG. 1 is a side elevational view of a combine harvester incorporating the principles of the instant invention, the generally vertical pivotal movement of the header and attached feeder house being shown in phantom.

Referring now to the drawings, and particularly, to FIG. 1, a side elevational view of a combine harvester can be seen. Any left or right references are used as a matter of convenience and are determined by standing at the rear of the machine, facing the forward end, the direction of travel. The combine 10 includes a base harvesting unit 11 fitted with a feeder housing 13 which, in turn, pivotally supports the crop harvesting header 15.

The feeder house 13 is pivotally mounted to the base unit 11 at pivot 14 to permit a generally vertical movement of the header 15 about the pivot 14 as shown in phantom in FIG. 1. The header 15 is mounted on a cradle assembly 17, which in turn is pivotally connected by a longitudinally extending generally horizontal pivot pin 18 to the feeder house 13 to permit a lateral flotation movement best seen in FIGS. 3 and 4. A more detailed description of this pivotal cradle assembly 17 can be found in U.S. Pat. No. 4,253,295, granted to Larimer J. Knepper on March 3, 1981, the description of which is incorporated herein by reference.

Figure 2:
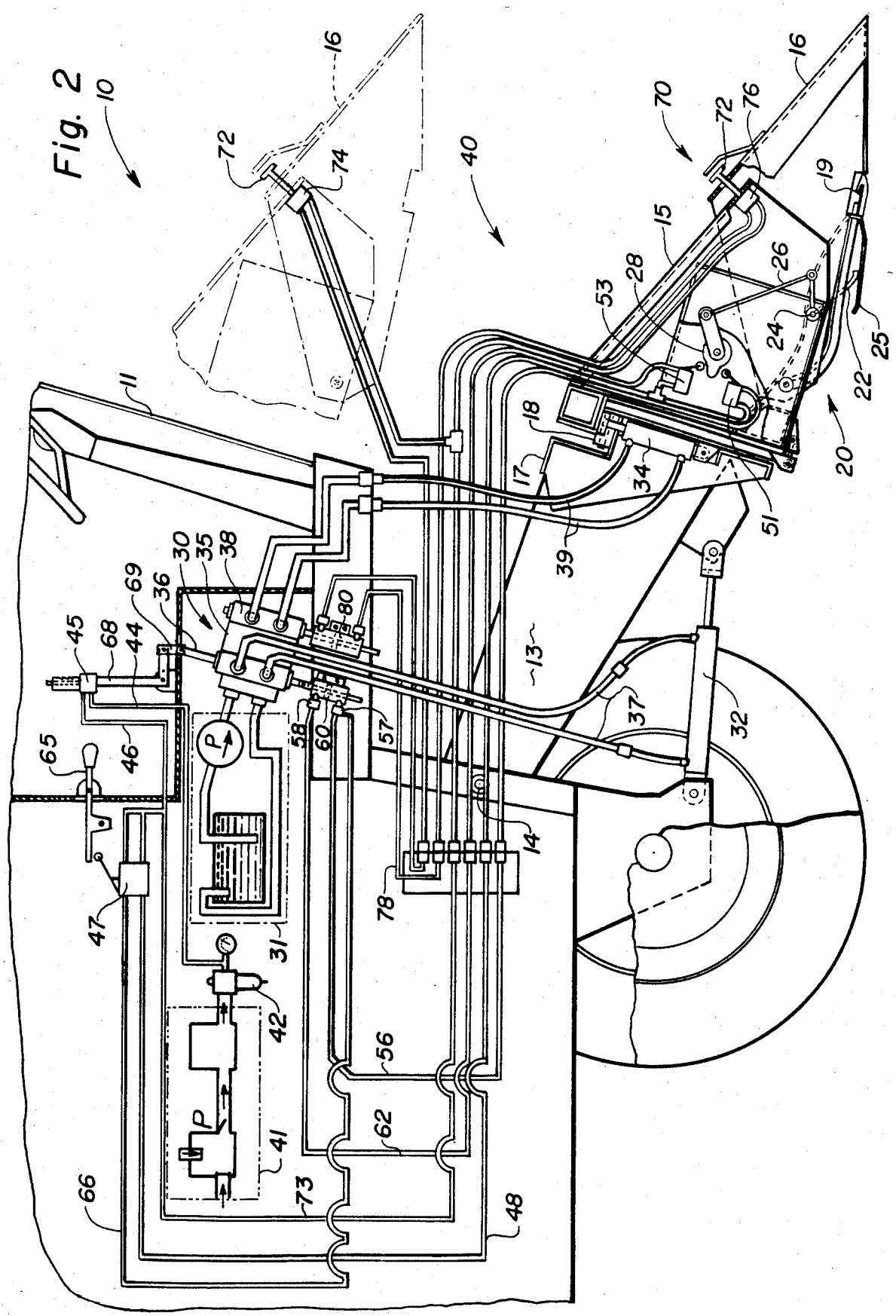
FIG. 2 is a schematic partial right side elevational view of the combine harvester seen in FIG. 1, the left side of the crop harvesting header being shown in phantom to depict the connection of the pneumatic lateral float mechanism, the pneumatic and hydraulic circuits for both the lateral and float and header height controls being shown.
Figure 3:
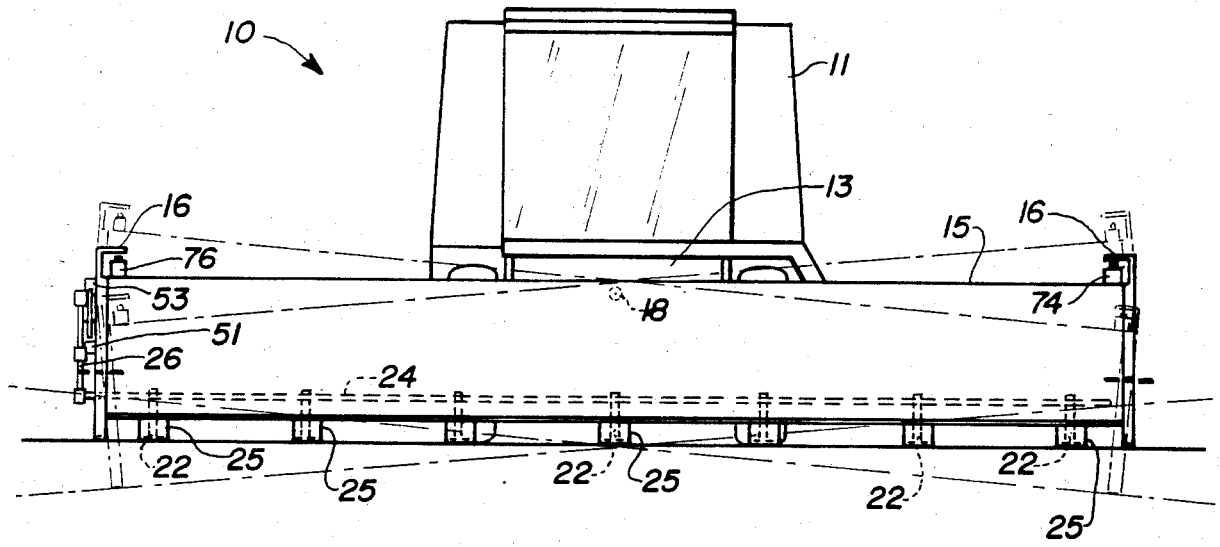
FIG. 3 is a schematic front elevational view of the combine harvester seen in FIG. 1, the lateral flotational movement of the crop harvesting header being shown in phantom.

As seen in FIGS. 1-3, the header 15 includes a transverse cutterbar 19 positioned adjacent the ground G to sever standing crop and initiate the crop harvesting process. Generally, it is desirable to maintain the cutterbar 19 in a fixed position relative to the ground G, particularly when harvesting crop growing close to the ground, such as soybeans. A sensing mechanism 20 is provided to sense the location of the ground G relative to the header 15. A plurality of transversely spaced sensors 22 are connected to a rotatably mounted transverse shaft 24 and are engaged with skid shoes 25 pivotally affixed to the cutterbar 19. A connecting linkage 26 transfers the pivotal movement of the sensors 22 and shaft 24 to a cam 28 mounted on the right side sheet of the header 15. In operation, as the position of the ground G moves relative to the header 15, the skid shoes 25 pivot on the cutterbar 19 to follow the ground G. The sensors 22 move with the skid shoes 25, causing a rotational movement of the shaft 24 and a corresponding movement of the cam 28 through the connecting linkage 26.

The hydraulic system 30 is of conventional design and includes a pair of hydraulic lift cylinders 32 interconnecting the base unit 11 and the feeder house 13 to affect a pivotal movement of the feeder house 13 about the pivot 14, and a pair of header tilt cylinders 34 disposed between the feeder house 13 and the cradle assembly 17 to affect a pivotal movement of the header 15 about the pivot 18. A hydraulic valve 35 connected to a source of pressurized hydraulic fluid 31 and includes a first linearly movable spool 36 to direct the flow of hydraulic fluid to the lift cylinders 32 through lines 37 and a second linearly movable spool 38 to direct the flow of hydraulic fluid to the tilt cylinders 34 through lines 39.

PNEUMATIC HEADER HEIGHT CONTROL

Figure 5:
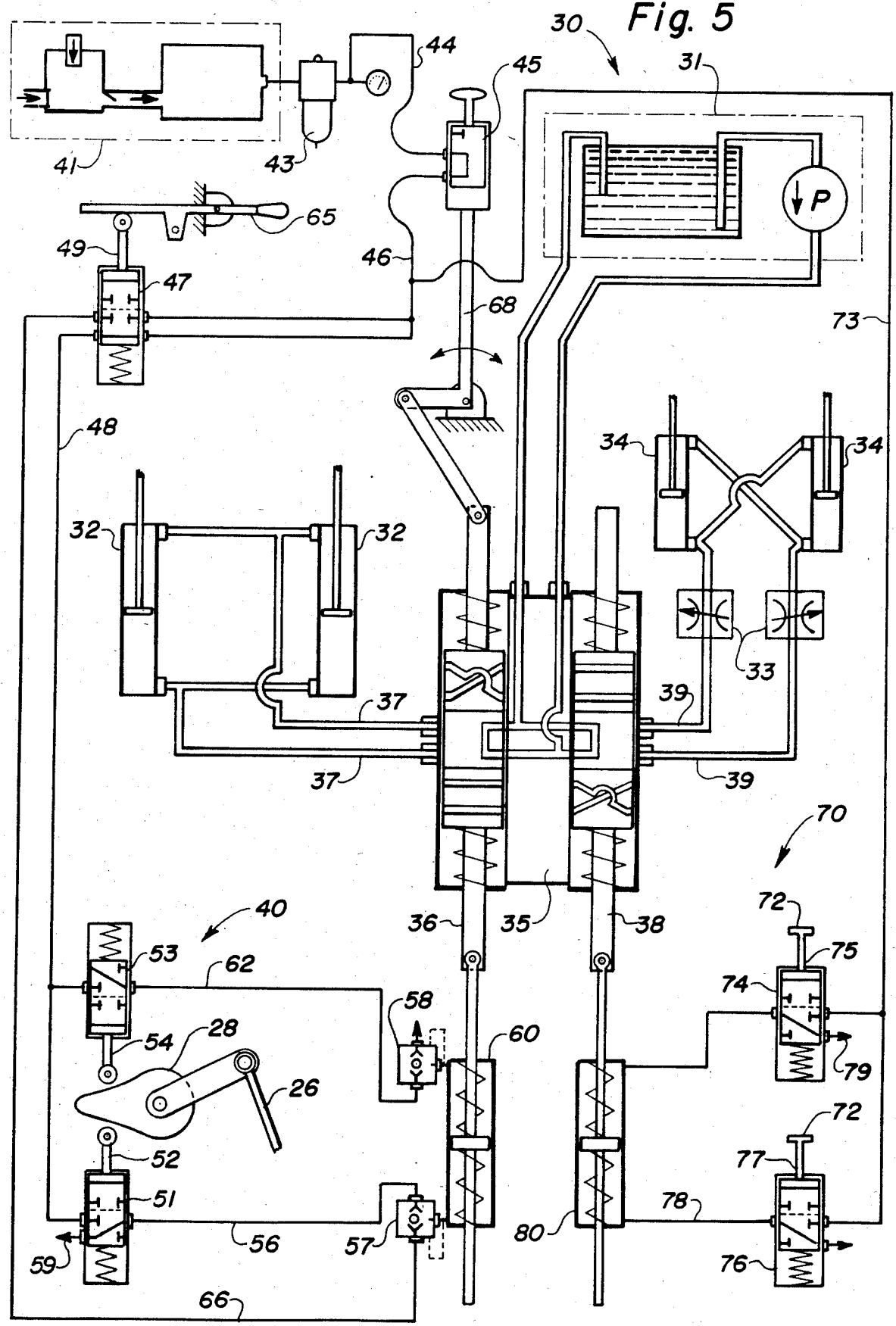
FIG. 5 is a diagrammatic view of the hydraulic and pneumatic circuits for both the lateral float and header height control mechanisms.

Referring now to FIGS. 2 and 5, the pneumatic system 40 for providing an automatic header height control can best be seen. A source of compressed air 41 is mounted on the base unit 11 and sends air through an oiler 43 for providing a mist of lubricant into the air flow. Air then passes through line 44 through a master on/off valve 45 located in the operator's compartment of the base unit 11 to control the flow of air through the pneumatic system 40. Once the pneumatic valve 45 is positioned to permit the flow of air therethrough, i.e., the master valve 45 is switched to the on position, air flows through line 46 to a reverse pneumatic direction valve 47, the operation of which will be described in further detail below. Under normal forward operating conditions, air exiting the reverse direction valve 47 travels through line 48 to a pair of spaced apart pneumatic valves 51,53.

The cam 28 is positioned between the pneumatic valves 51,53 such that motion induced into the pneumatic spools 82,84 by the movement of the sensors 22 through the connecting linkage 26 corresponding to a change in relative position of the ground G, affects an actuation of one or the other of the pneumatic valves 51,53, depending upon whether the header needs to go up or down to maintain the relative position with respect to the ground G. For example, if the ground G rises, requiring a raising of the header 15, the cam 28 is rotated by the sensors 22 to engage the pneumatic valve 51 and shift the spool 52 to permit air to pass through line 56 to a check valve 57 forcing air into the lower end of the pneumatic cylinder 60, thereby shifting the hydraulic spool 37 to permit a flow of hydraulic fluid through the valve 35 into the lift cylinders 32 to cause an extension thereof, raising the feeder house and attached header.

Air pushed out of the pneumatic cylinder 60 exits the other check valve 58. When the header 15 has moved to the proper position relative to the ground G, the sensors 22 cause a rotation of the cam 28 back into the neutral position seen in FIG. 5, permitting the spring loaded spool 52 of the pneumatic valve 51 to return to the position seen in FIG. 5. The pressurized air in the lower end of the pneumatic cylinder 60 can then escape back up through line 56 to escape through the exhaust port in the valve 51 indicated by the arrow 59. Since the air pressure on both sides of the pneumatic cylinder 60 is equalized, the spring loaded pneumatic cylinder 60 and the spring loaded hydraulic spool 36 seek the central, neutral positions shown in FIG. 5, fixing the positions of the hydraulic lift cylinders 32.

Similarly, if the ground contour falls away from the header 15, requiring a lowering of the header 15 to maintain the relative position therebetween, the sensors 22 affect a rotation of the cam 28 to engage the pneumatic valve 53, shifting the spool 54 to permit air to flow through the valve 53 into line 62. Air then passes through the check valve 58 and forces pressurized air into the upper end of the pneumatic cylinder 60 to effect a shifting of the hydraulic spool 36 to direct a flow of hydraulic fluid to the lift cylinders 32 causing a retraction thereof and lowering the header until the cam 28 is shifted back into its neutral position seen in FIG. 5. As described above, the shifting of the spool 54 to the position shown in FIG. 5 allows an equalizing of the pressure on either side of the pneumatic cylinder 60 to permit the spring loaded cylinder 60 and the spring loaded spool 36 to seek the neutral positions, fixing the position of the lift cylinders 32.

The pneumatic control 40 can also be utilized to affect an automatic raising of the header 15 whenever the base unit 11 is engaged for rearward movement. The control lever 65 signifies the control lever necessary for engagement of the drive mechanism (not shown) to drive the base unit in a rearward direction. By positioning the reversing valve 47 so that the spool 49 is shifted whenever the reverse control lever 65 is engaged, the flow of air will be diverted from line 48 through line 66 directly into the check valve 57 and into the lower end of the pneumatic cylinder 60, causing an extension of the hydraulic lift cylinders 32 in the same manner as indicated above. The header 15 will be raised until the control lever 65 is manipulated to disengage the rearward movement of base unit 11 causing the spring loaded spool 49 to shift back into the position shown in FIG. 5 and permitting air to flow through line 48. By interconnecting the lift valve spool 36 to a manual control lever 68 by a link 69, the spool 36 can also be manually shifted through manipulation of the lever 68 to manually control the height of the header 15 relative to the ground G. By mounting the master on/off valve 45 in the control lever 68, the pneumatic system 40 can be shut off to facilitate the manual operation of the header lift cylinders 32, if desired.

PNEUMATIC LATERAL FLOAT CONTROL

Referring now to FIGS. 2–5, the pneumatic lateral float control mechanism 70 can best be seen. The opposing transverse ends of the header 15 are provided with pivotally connected crop dividers 16 that engage and follow the contours of the ground G and, thereby are movable relative to the header 15. By placing sensors 72 between the crop divider 16 and the adjacent portion of the header 15, as shown in FIG. 2, the movement of the ground downwardly away from the header 15 can be sensed.

Compressed air flowing from the source for compressing the air 41 through the master on/off valve 45 and into line 46 can flow through line 73 to a pair of pneumatic valves 74,76 disposed on the opposing ends of the header 15. Hence, the master valve 45 controls the on/off operation of both the pneumatic header height control and the pneumatic lateral float control. The pneumatic spools 75,77 corresponding to pneumatic valves 74,76, respectively, are connected directly to the sensors 72 and are spring loaded into an up position. Whenever the crop divider 16 falls relative to the header 15, i.e., following the downwardly falling ground contours, the sensor 72 causes a shifting of the respective spool 75,77 to permit the flow of compressed air into the pneumatic cylinder 80, which is connected directly to the hydraulic spool 38 for controlling the direction of flow into the hydraulic tilt cylinders 34.

Figure 4:
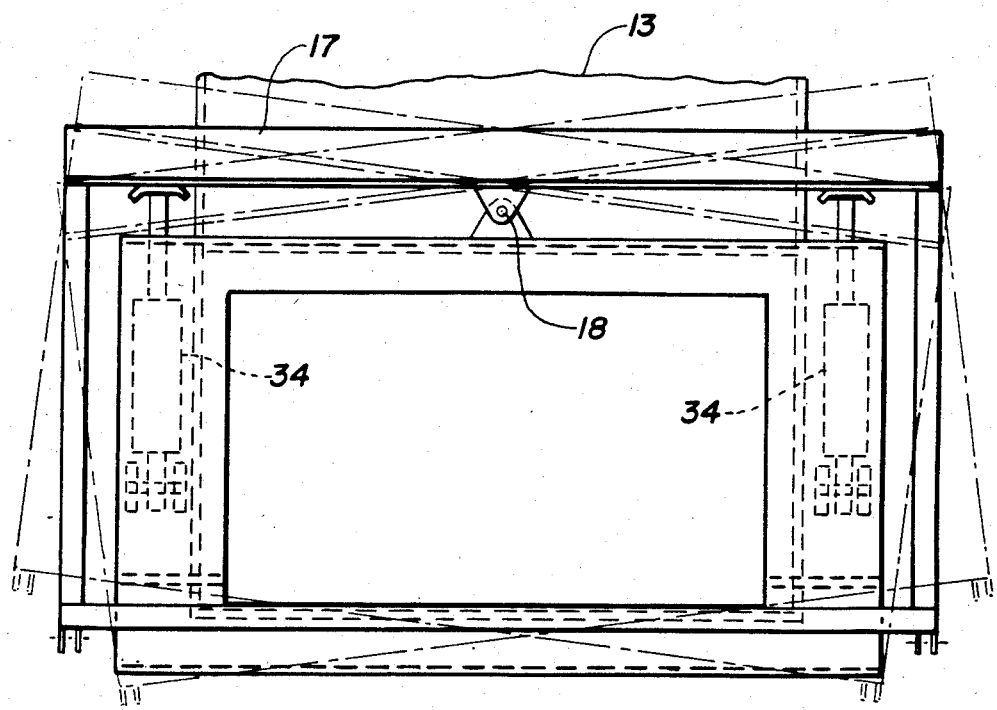
FIG. 4 is an enlarged view of the header tilt mechanism corresponding to the view seen in FIG. 3, the movement of the cradle assembly for attaching the header being shown in phantom.

For example, if the ground contours drop along the right side of the header 15, requiring a tilting of the header as shown in FIGS. 3 and 4, the right crop divider 16 will follow the ground contour moving downwardly relative to the header 15 and depress the right sensor 72, affecting a shifting of the right pneumatic valve spool 77 to permit the flow of compressed air from line 73 through pneumatic valve 76 and into line 78 and the lower end of the pneumatic cylinder 80. The subsequent movement of the pneumatic cylinder 80 causes the hydraulic spool 38 to shift and direct the flow of hydraulic fluid into the hydraulic tilt cylinders 34 so that the header 15 is rotated about the pivot 18 in a clockwise direction when viewed from the rear, lowering the right side of the header and raising the left side of the header, to follow the changing ground contours. Flow regulators 33 may be provided to regulate the speed of tilting of the header, such as to be proportionate to the speed of the combine, in a conventional manner. Air escaping from the upper end of the pneumatic cylinder 80 exists through the exhaust port indicated by the arrow 79 in the pneumatic valve 74.

When the header has been rotated about the pivot 18 to a position relative to the ground to permit the crop divider 16 to raise relative to the header 15, thereby permitting the schematic spool 77 to return to the position shown in FIG. 5, the pressure on either side of the pneumatic cylinder 80 is equalized, permitting the spring loaded spool 38 and the spring loaded cylinder 80 to return to the central neutral position, freezing the position of the hydraulic tilt cylinders 34. The rotation of the header 15 about the pivot 18 in a counterclockwise direction when viewed from the rear is similar to that described above except that the spool 75 directs the flow of compressed air into the upper end of the pneumatic cylinder to affect a corresponding movement of the hydraulic spool 38. It should be noted that if the ground contour falls away from both transverse ends of the header 15 equally, the crop divider 16 will effect a movement of both pneumatic spools 75,77 directing the flow of compressed air to both ends of the pneumatic cylinder 80, resulting in no corresponding movement to the hydraulic spool 38. It should be realized that in such situations, the header height control should be activated to affect a lowering of the crop harvesting header 15.

It should be realized that a combination of the above described pneumatic header height control and pneumatic lateral float control will result in a control mechanism to affect a movement of the header to closely follow the contours of the ground. The components utilized in the control mechanisms are durable and inexpensive to install and maintain. The coupling of hoses between the various components can be accomplished by quick attach couplings to facilitate both mounting and maintenance. The use of the oiler provides a lubricant to all the moving parts through which the compressed air flows. The pneumatic control systems can be installed on substantially any combine utilizing the necessary hydraulic components.

It will be understood that changes in the details, materials, steps and arranges of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a combine having a mobile frame adapted for movement across a field; a transverse header supported from said frame for movement in a generally vertical direction relative to the ground and said mobile frame, said header being operable to collect crop material from the field and initiate the crop harvesting process, said header being generally vertically movable relative to said frame to follow longitudinal ground contours; sensing means mounted on said header to sense the location of the ground rleative to said header; and header lift means interconnecting said header and said frame to power the generally vertical movement of said header relative to said frame, the improvement comprising:

pneumatic control means operatively connected to said sensing means and to said header lift means to effect the operation of said header lift means to move said header in a generally vertical direction in response to the sensing of a change in the position of the ground relative to said header by said sensing means such that the position of said header relative to said frame is varied to maintain a generally constant positional relationship between the ground and said header; and means for selectively actuating a movement of said combine in a reverse direction operatively connected to said pneumatic control means such that an actuation of said actuating means causes said pneumatic control means to effect a raising of said header so that said header is raised in response to the selective movement of said combine in a reverse direction.

2. The combine of claim 1 wherein said pneumatic control means includes a pneumatic spool in pneumatic flow communication with a pneumatic cylinder connected to said header lift means; said pneumatic spool being operatively connected to said actuating means.

3. The combine of claim 2 wherein said pneumatic spool is movable between first and second positions, said first position directing a flow of air to additional pneumatic spools operably connected to said sensing means to control the position of said header relative to the ground, said additional pneumatic spools being connected to said sensing means and being in pneumatic flow communication with said pneumatic cylinder to effect a movement of said header relative to said frame in response to said sensing means sensing a change in the ground contour, said second position bypassing said additional pneumatic spools to direct a flow of air directly to said pneumatic cylinder to effect a raising of said header.

* * * * *